(12) United States Patent
Lee et al.

(10) Patent No.: US 12,677,076 B2
(45) Date of Patent: Jul. 7, 2026

(54) IMAGE SENSING DEVICE

(71) Applicant: SK hynix Inc., Gyeonggi-do (KR)

(72) Inventors: Seung Hwan Lee, Gyeonggi-do (KR); Gun Hee Yun, Gyeonggi-do (KR); Min Kyu Kim, Gyeonggi-do (KR); Han Sol Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 154 days.

(21) Appl. No.: 18/596,633

(22) Filed: Mar. 6, 2024

(65) Prior Publication Data

US 2025/0088768 A1    Mar. 13, 2025

(30) Foreign Application Priority Data

Sep. 7, 2023    (KR) ........................ 10-2023-0118963

(51) Int. Cl.
$H04N\ 25/77$    (2023.01)
$H04N\ 25/709$    (2023.01)
$H04N\ 25/76$    (2023.01)
$H04N\ 25/78$    (2023.01)

(52) U.S. Cl.
CPC .......... *H04N 25/77* (2023.01); *H04N 25/709* (2023.01); *H04N 25/7795* (2023.01); *H04N 25/78* (2023.01)

(58) Field of Classification Search
CPC .. H04N 25/77; H04N 25/709; H04N 25/7795; H04N 25/78
See application file for complete search history.

(56) References Cited

U.S. PATENT DOCUMENTS

| | | | | |
|---|---|---|---|---|
| 11,070,759 | B2 * | 7/2021 | Shin | H04N 25/78 |
| 2015/0319388 | A1 * | 11/2015 | Ohshitanai | H04N 25/77 |
| | | | | 348/301 |
| 2016/0366357 | A1 * | 12/2016 | Shin | H04N 25/671 |
| 2017/0280085 | A1 * | 9/2017 | Kim | H04N 25/628 |
| 2022/0286628 | A1 * | 9/2022 | Kim | H04N 25/628 |
| 2024/0414456 | A1 * | 12/2024 | Yun | H04N 25/59 |

FOREIGN PATENT DOCUMENTS

| | | |
|---|---|---|
| KR | 10-2307376 B1 | 10/2021 |
| KR | 10-2477992 B1 | 12/2022 |

* cited by examiner

*Primary Examiner* — Marly S Camargo
(74) *Attorney, Agent, or Firm* — IP & T GROUP LLP

(57) ABSTRACT

An image sensing device for obtaining an image of a scene by sensing light is disclosed. The image sensing device includes a pixel circuit configured to output a pixel signal based on a voltage level of a floating diffusion node at which charges generated corresponding to an intensity of incident light are accumulated, a voltage controller configured to control a voltage level of an output node where the pixel signal is output in response to a voltage control signal, a conversion circuit configured to convert the pixel signal into a digital signal, and a voltage trimming circuit configured to control the voltage control signal based on the digital signal.

20 Claims, 5 Drawing Sheets

100

IMAGE SENSING DEVICE

CROSS-REFERENCE TO RELATED APPLICATION

The present application claims priority to, and the benefits of Korean patent application No. 10-2023-0118963 filed on Sep. 7, 2023, which is hereby incorporated by reference in its entirety.

TECHNICAL FIELD

The technology and implementations disclosed in the present disclosure generally relate to an image sensing device capable of obtaining an image of a scene by sensing light.

BACKGROUND

As the size of a pixel array of an image sensor increases, a readout time for each row line (i.e., a row line readout time) decreases, making it difficult to secure a sufficient transfer time of a pixel signal. Moreover, as the size of the pixel array of the image sensor increases, the size of a loading capacitance of a pixel output line increases, so that the time for the pixel signal being output from each pixel to be transmitted to an input terminal of a readout circuit (e.g., an input terminal of a comparator) can also increase.

Each pixel signal (i.e., a pixel voltage) may be read out during a reset step (e.g., a reset readout step) and a signal step (e.g., a signal readout step). The reset readout step and the signal readout step may occur periodically, and a sufficient time period must be allocated for each cycle so that the pixel voltage can settle to a predefined voltage before each of the reset readout step and the signal readout step begins.

The pixel voltage may settle to a predefined value prior to the beginning of the reset readout step or the signal readout step. A frame rate of the image sensor may be affected by a settling time related to the pixel voltage. A row selection time may increase due to the settling time, resulting in reduction in a readout speed. As the resolution goes higher, the settling time becomes longer. Thus, technology capable of reducing the settling time is required.

SUMMARY

Various embodiments of the present disclosure relate to an image sensing device capable of minimizing a settling time of a pixel signal that is read out from a column line.

In accordance with an embodiment of the present disclosure, an image sensing device may include a pixel circuit configured to output a pixel signal based on a voltage level of a floating diffusion node at which charges generated corresponding to an intensity of incident light are accumulated; a voltage controller configured to control a voltage level of an output node where the pixel signal is output in response to a voltage control signal; a conversion circuit configured to convert the pixel signal into a digital signal; and a voltage trimming circuit configured to control the voltage control signal based on the digital signal.

In accordance with another embodiment of the present disclosure, an image sensing device may include a floating diffusion node configured to accumulate charges generated corresponding to an intensity of incident light; a selection transistor configured to output a pixel signal corresponding to a voltage level of the floating diffusion node to an output node in response to a selection control signal; a voltage control transistor connected between a power-supply voltage terminal and a first node and configured to receive a voltage control signal through a gate terminal thereof; an inversion transistor connected between the first node and the output node and configured to receive an inverted selection control signal through a gate terminal thereof; a conversion circuit configured to convert the pixel signal into a digital signal; and a voltage trimming circuit configured to control the voltage control signal based on the digital signal.

In accordance with another embodiment of the present disclosure an image sensing device includes a pixel array including a plurality of pixels and configured to generate a pixel signal; a row driver configured to drive the plurality of pixels; a conversion circuit configured to generate a digital signal based on a ramp signal and the pixel signal; and a voltage trimming circuit configured to trim, based on the digital signal, a voltage level of a control signal for controlling a voltage level of an output node through which the pixel signal is output, wherein the voltage trimming circuit is configured to adjust the voltage level of the control signal to a first level when a digital code value of the digital signal is a first value, and adjust the voltage level of the control signal to a second level higher than the first level when the digital code value of the digital signal is a second value greater than the first value.

It is to be understood that both the foregoing general description and the following detailed description of the present disclosure are illustrative and descriptive and are intended to provide further description of the disclosure as claimed.

BRIEF DESCRIPTION OF THE DRAWINGS

The above and other features and beneficial aspects of the present disclosure will become readily apparent with reference to the following detailed description when considered in conjunction with the accompanying drawings.

DETAILED DESCRIPTION

The present disclosure provides implementations and examples of an image sensing device for obtaining an image of a scene by sensing light that may be used in configurations to substantially address one or more technical or engineering issues and to mitigate limitations or disadvantages encountered in some image signal processors in the art. Some implementations of the present disclosure relate to an image sensing device capable of minimizing a settling time of a pixel signal that is read out from a column line. In recognition of the issues above, the image sensing device according to embodiments of the present disclosure can perform a high-speed readout operation by minimizing a settling time of a pixel signal being read out from a column line.

Reference will now be made in detail to some embodiments of the present disclosure which are illustrated in the accompanying drawings. Wherever possible, the same reference numbers will be used throughout the drawings to refer to the same or like parts. While the disclosure is susceptible to various modifications and alternative forms, specific embodiments thereof are shown by way of the drawings. However, this disclosure should not be construed as being limited to the embodiments set forth herein.

Hereinafter, various embodiments will be described with reference to the accompanying drawings. However, it should be understood that the present disclosure is not limited to specific embodiments, but includes various modifications, equivalents and/or alternatives of the embodiments. The embodiments of the present disclosure may provide a variety of effects capable of being directly or indirectly recognized through the present disclosure.

Figure 1:
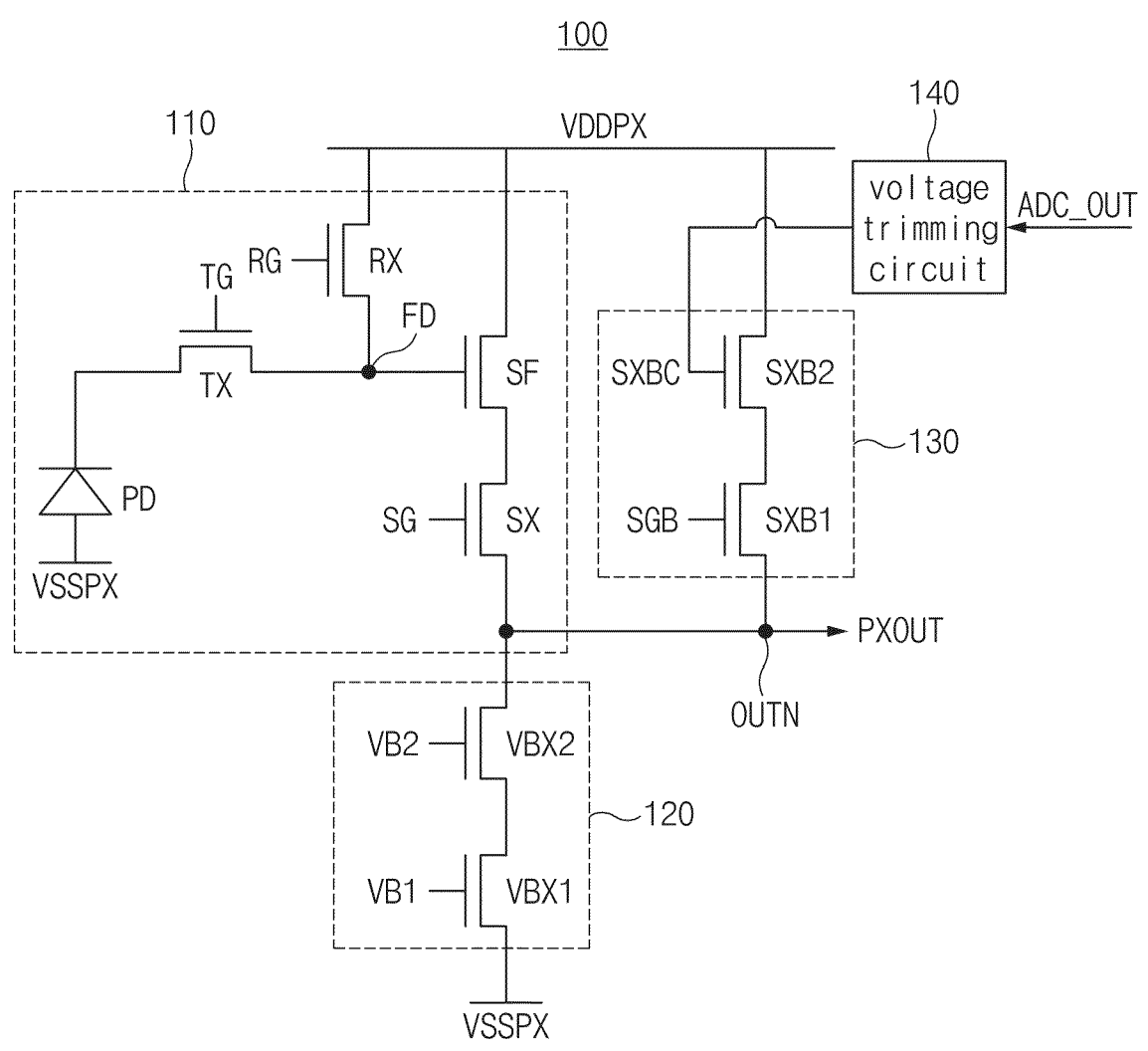
FIG. 1 is a circuit diagram illustrating a configuration of a pixel array of an image sensing device according to an embodiment of the present disclosure.

FIG. 1 is a circuit diagram illustrating a configuration of a pixel array 100 of an image sensing device according to an embodiment of the present disclosure.

Referring to FIG. 1, the pixel array 100 of the image sensing device may include a pixel circuit 110, a pixel biasing circuit 120, a voltage controller 130, and a voltage trimming circuit 140.

Here, the pixel circuit 110 may be one of a plurality of unit pixels included in the pixel array 100. Although only one pixel circuit 110 is shown in FIG. 1 for convenience of description, other implementations are also possible, and it should be noted that other pixel circuits may have substantially the same structure and operation as the pixel circuit 110.

The pixel circuit 110 may generate a pixel signal PXOUT by sensing an image in response to several control signals TG, RG, and SG. The pixel circuit 110 may include a photoelectric conversion element PD, a transfer transistor TX, a reset transistor RX, a floating diffusion node FD, a source follower transistor SF, and a selection transistor SX. Although the pixel circuit 110 shown in FIG. 1 is illustrated as including one photoelectric conversion element PD for convenience of description, other implementations are also possible, and it should be noted that the pixel circuit 110 may also be implemented as a shared pixel having several photoelectric conversion elements as needed. In this case, several transfer transistors may be provided to correspond to a plurality of photoelectric conversion elements.

The photoelectric conversion element may generate and accumulate photocharges corresponding to the intensity of incident light. For example, the photoelectric conversion element PD may be implemented as a photodiode, a phototransistor, a photogate, a pinned photodiode or a combination thereof. When the photoelectric conversion element PD is implemented as a photodiode, the photoelectric conversion element PD may be a region doped with impurities of a second conductivity type (e.g., N-type) in a substrate having impurities of a first conductivity type (e.g., P-type).

A transfer transistor TX may be connected between the photoelectric conversion element PD and the floating diffusion node FD. The transfer transistor TX may be turned on or off in response to the transfer signal TG, and the turned-on transfer transistor TX may transmit photocharges accumulated in the photoelectric conversion element PD to the floating diffusion node FD.

The reset transistor RX may be connected between a power-supply voltage terminal (VDDPX) and the floating diffusion node FD, and may reset a voltage level of the floating diffusion node FD to a power-supply voltage supplied though the power-supply voltage terminal (VDDPX) in response to the pixel reset signal RG.

The floating diffusion node FD may receive photocharges from the transfer transistor TX. The floating diffusion node FD may be connected to a gate of a source follower transistor SF, and may be referred to as a sensing node.

In some implementations, a logic high level may refer to a voltage level for activating (e.g., turning on) a corresponding device (e.g., a transistor), and a logic low level may refer to a voltage level for deactivating (e.g., turning off) a corresponding device (e.g., a transistor).

The source follower transistor SF may be connected between the power-supply voltage terminal VDDPX and the selection transistor SX, may amplify a change in electrical potential of the floating diffusion node FD that receives photocharges accumulated in the photoelectric conversion element PD, and may transmit the amplified potential to the selection transistor SX.

The selection transistor SX may be connected between the source follower transistor SF and an output node OUTN, may be turned on by a selection control signal SG, and may convert the electrical signal received from the source follower transistor SF into a pixel signal PXOUT.

The pixel biasing circuit 120 may be driven in response to bias voltages VB1 and VB2 and may operate as a load for the source follower transistor SF. The pixel biasing circuit 120 may include transistors VBX1 and VBX2 (hereinafter referred to as "source transistors").

The transistors VBX1 and VBX2 may be connected in series between the output node OUTN and a ground voltage terminal VSSPX. The transistor VBX1 may receive the bias voltage VB1 through a gate terminal thereof. The transistor VBX2 may receive the bias voltage VB2 through a gate terminal thereof. In addition, the transistor VBX2 is illustrated as a single transistor structure, but may also be implemented as a current mirror having a cascode structure.

In addition, the voltage controller 130 may control the voltage level of the output node OUTN in response to an inverted selection control signal SGB and a voltage control signal SXBC. The pixel signal PXOUT may be output through the output node OUTN. The voltage controller 130 may include transistors SXB1 and SXB2.

The transistors SXB1 and SXB2 may be connected in series between the power-supply voltage terminal VDDPX and the output node OUTN. The transistor SXB1 (hereinafter referred to as "an inversion transistor") may receive the inverted selection control signal SGB through a gate terminal thereof. The transistor SXB1 may selectively transmit the voltage received through the transistor SXB2 to the output node OUTN in response to the inverted selection control signal SGB. Here, the inverted selection control signal SGB may be a signal having a phase opposite to that of the selection control signal SG. Accordingly, the transistor SXB1 may operate complementarily (or inversely) with the selection transistor SX.

In addition, the transistor SXB2 (hereinafter referred to as "voltage control transistor") may receive a voltage control signal SXBC through a gate terminal thereof. The transistor SXB2 may selectively transmit a voltage corresponding to the voltage level of the voltage control signal SXBC to the transistor SXB1. The voltage control signal SXBC may be a signal having a voltage level adjusted in response to the voltage level of the floating diffusion node FD. Here, the voltage control signal SXBC may be received from the voltage trimming circuit 140.

The voltage trimming circuit 140 may receive a digital signal ADC_OUT and control the voltage level of the voltage control signal SXBC. For example, the voltage trimming circuit 140 may adjust the voltage level of the voltage control signal SXBC to a first level when the digital code value of the digital signal ADC_OUT is the first value. In addition, the voltage trimming circuit 140 may adjust the voltage level of the voltage control signal SXBC to a second level higher than the first level when the digital code value of the digital signal ADC_OUT is a second value greater than the first value. Here, the digital signal ADC_OUT may be a signal obtained by digitizing the pixel signal PXOUT or a value obtained by monitoring the voltage level of the floating diffusion node FD.

The voltage level of the pixel signal PXOUT being output from the pixel array 100 may change in response to the voltage level of the floating diffusion node FD of the pixel circuit 110. As a difference in voltage between the floating diffusion node FD and the voltage control signal SXBC increases, the settling time of the pixel signal PXOUT may increase. Accordingly, the image sensing device according to embodiments of the present disclosure may perform trimming of the voltage level of the voltage control signal SXBC based on the digital signal ADC_OUT corresponding to the voltage level of the floating diffusion node FD, resulting in reduction in the settling time of the pixel signal PXOUT.

The operation of the pixel array 100 having the above-described constituent elements will be described in more detail with reference to the operation timing diagram of FIG. 2 to be described later.

Figure 2:
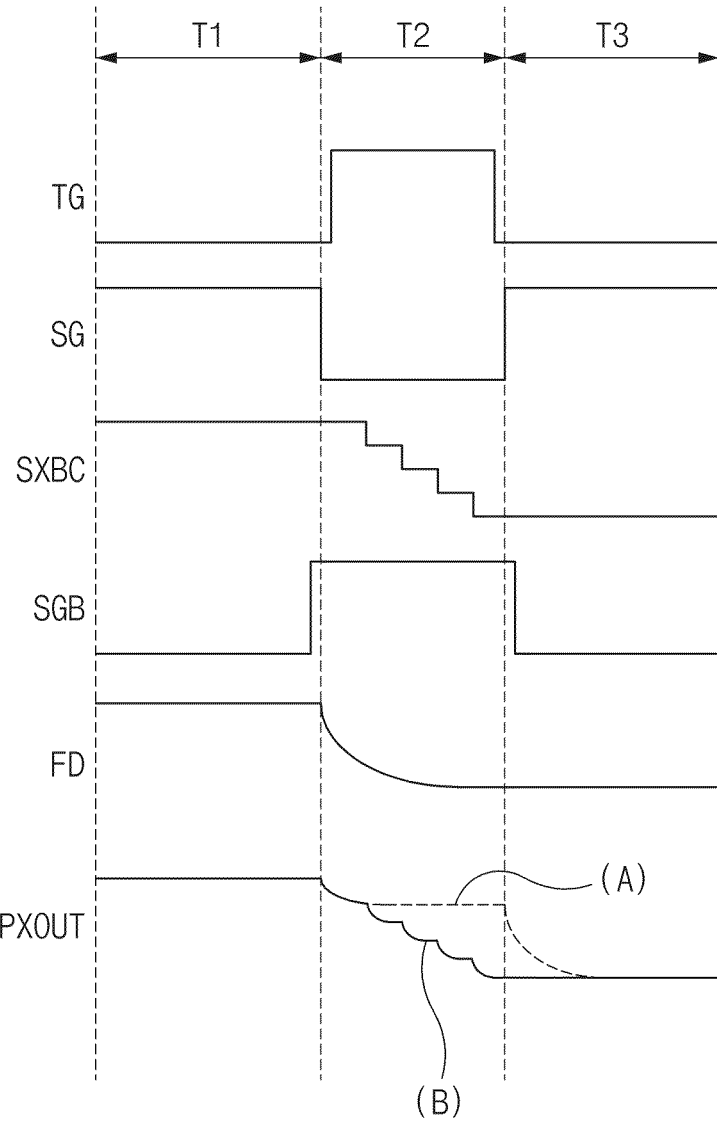
FIG. 2 is a timing diagram illustrating an operation of a pixel array shown in FIG. 1 according to an embodiment of the present disclosure.

FIG. 2 is a timing diagram illustrating an operation of the pixel array shown in FIG. 1 according to an embodiment of the present disclosure.

Referring to FIG. 2, in a time period T1, when the transfer signal TG is at a low level, the transfer transistor TX may be turned off. When the selection control signal SG is at a high level, the selection transistor SX may be turned on and the electrical signal received from the source follower transistor SF may be output as the pixel signal PXOUT. Accordingly, in the time period T1, the voltage level of the pixel signal PXOUT may be maintained at a logic high level corresponding to the voltage level of the floating diffusion node FD.

In the time period T1, the voltage level of the voltage control signal SXBC may be the second level. In this case, the second level may be a default value (i.e., a preset reference value) of the voltage control signal SXBC, and may be a voltage that is set to be equal to or approximately (substantially) similar to the voltage level of the floating diffusion node FD through testing or register value setting, etc. Whereas the transistor SXB2 receives the voltage control signal SXBC of the second level and transmits a voltage corresponding to the received voltage control signal SXBC to the transistor SXB1, the inverted selection control signal SGB is at a low level, so that the transistor SXB1 may be turned off.

Thereafter, when the transfer signal TG transitions to a high level in the time period T2, the transfer transistor TX may be turned on. In addition, when the selection control signal SG transitions to a low level, the selection transistor SX may be turned off. Then, the electrical signal received from the source follower transistor SF is no longer transmitted as the pixel signal PXOUT.

Here, when the inverted selection control signal SGB transitions to a high level, the transistor SXB1 may be turned on. In this case, when a fixed voltage control signal SXBC is used, the voltage level of the pixel signal PXOUT may be fixed to a specific voltage level, thus settling to the specific voltage level, as shown in (A) of FIG. 2. In this case, when the pixel signal PXOUT is fixed and settled to a specific voltage level, the settling time during which the pixel signal PXOUT is settled by a voltage level of the floating diffusion node FD at a time point where the selection control signal SG transitions to a high level during a time period T3 may increase, resulting in reduction in a readout speed.

That is, when the selection control signal SG transitions to a low level in the time period T2, the voltage level of the floating diffusion node FD may not be transmitted to the pixel signal PXOUT through the source follow transistor SF, and a voltage corresponding to the voltage control signal SXBC may determine a voltage level of the pixel signal PXOUT. If the voltage control signal SXBC is controlled to be the same as or substantially similar to the voltage level of the floating diffusion node FD in the time period T2, the voltage control signal SXBC may be controlled in a similar (or substantially similar) manner to the voltage level of the pixel signal PXOUT being controlled by the floating diffusion node FD during the time period T2. Accordingly, the readout speed can be increased by reducing an additional settling time in a time period T3.

Accordingly, the image sensing device according to embodiments of the present disclosure may adjust the voltage level of the voltage control signal SXBC according to the voltage level of the pixel signal PXOUT in the time period T2. When the voltage level of the voltage control signal SXBC is lowered, the voltage level of the output node OUTN may be determined by a voltage to be applied to the transistor SXB1 through the transistor SXB2. That is, the voltage level of the output node OUTN may be determined by a voltage corresponding to the voltage level of the voltage control signal SXBC. In some implementations, since the voltage control signal SXBC is a signal based on the digital signal ADC_OUT, the voltage level may sequentially decrease in a stepwise manner. Then, as shown in (B) of FIG. 2, the voltage level of the pixel signal PXOUT may decrease similar to the voltage level of the floating diffusion node FD.

That is, the image sensing device according to embodiments of the present disclosure may control the voltage level of the voltage control signal SXBC upon receiving the digital signal ADC_OUT corresponding to the voltage level of the pixel signal PXOUT from the voltage trimming circuit 140. As a result, the voltage level of the pixel signal PXOUT may decrease in response to the voltage level of the voltage control signal SXBC, thereby reducing the settling time in the time period T3.

Thereafter, when the selection control signal SG transitions to a high level again in the time period T3, the selection transistor SX may be turned on. When the inverted selection control signal SGB transitions to a low level again, the transistor SXB1 may be turned off. Then, since the voltage of the transistor SXB1 does not affect the output node OUTN, the voltage of the pixel signal PXOUT can settle to a voltage level corresponding to the voltage of the floating diffusion node FD.

That is, when the selection transistor SX is turned off in the above-described time period T2, the voltage of the pixel signal PXOUT may be controlled in response to the voltage control signal SXBC. In addition, when the selection transistor SX is turned on in the time period T3, the voltage of the pixel signal PXOUT may be controlled in response to the voltage level of the floating diffusion node FD.

Figure 3:
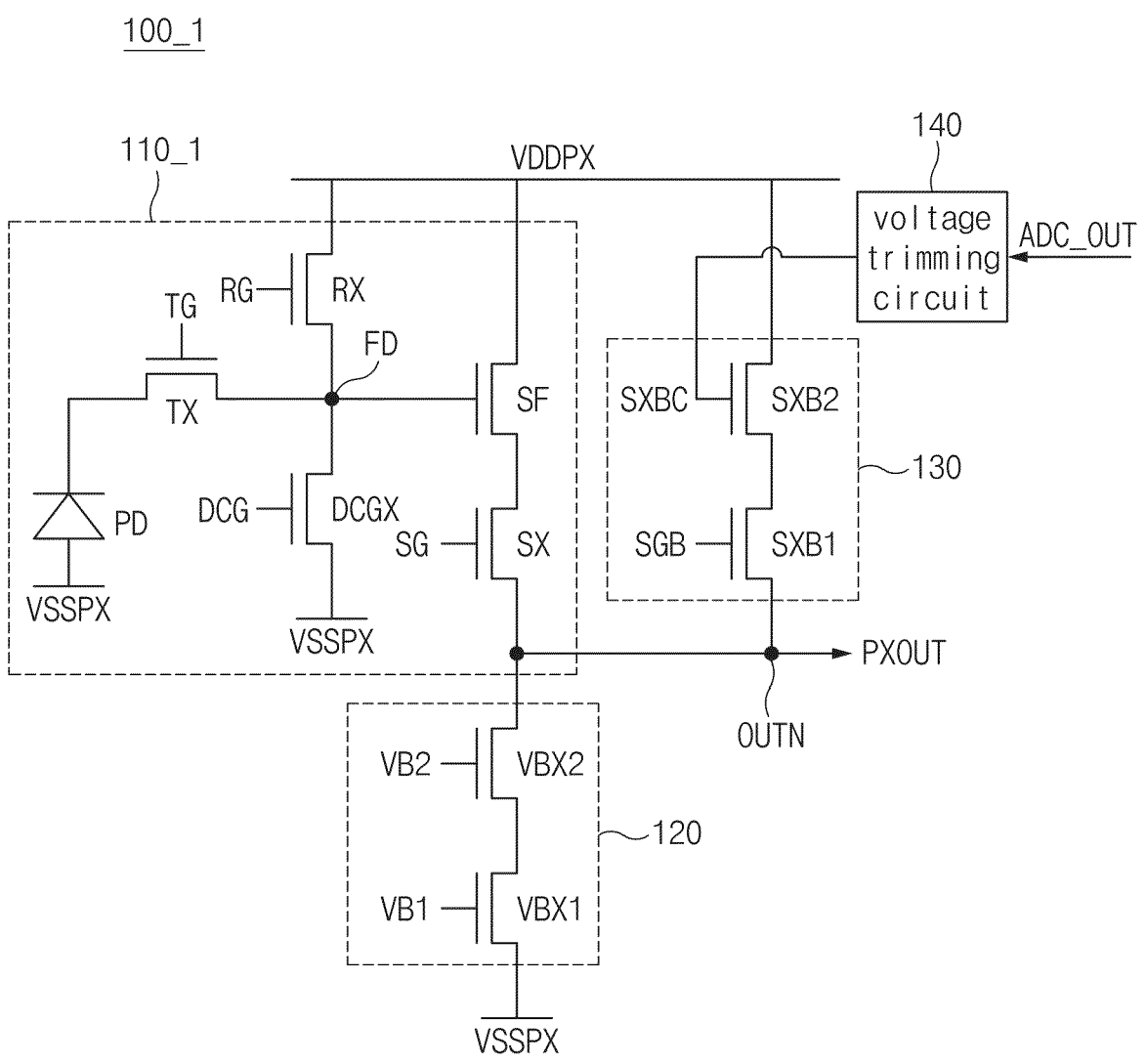
FIG. 3 is a circuit diagram illustrating a configuration of an image sensing device according to another embodiment of the present disclosure.

FIG. 3 is a circuit diagram illustrating a configuration of an image sensing device according to another embodiment of the present disclosure.

Referring to FIG. 3, the pixel array 100_1 of the image sensing device may include a pixel circuit 110_1, a pixel biasing circuit 120, a voltage controller 130, and a voltage trimming circuit 140. The pixel circuit 110_1 of FIG. 3 is different in structure from the pixel circuit 110 of FIG. 1, and the remaining elements other than the pixel circuit 110_1 of FIG. 3 are the same as those of FIG. 1. Accordingly, in the embodiment of FIG. 3, the same reference numerals are used for the same components as those of FIG. 1, and as such redundant description thereof will be omitted for brevity.

The pixel circuit 110_1 may generate a pixel signal PXOUT by sensing an image in response to the control signals TG, RG, SG, and DCG. The pixel circuit 110_1 may further include a conversion gain control element DCGX in addition to a photoelectric conversion element PD, a transfer transistor TX, a reset transistor RX, a floating diffusion node FD, a source follower transistor SF, and a selection transistor SX.

Here, the conversion gain control element DCGX may control the voltage level of the floating diffusion node FD in response to the conversion gain control signal DCG. The conversion gain control element DCGX may be connected between the floating diffusion node FD and the ground voltage terminal VSSPX, and may be implemented as a transistor that receives the conversion gain control signal DCG through a gate terminal thereof.

The conversion gain control signal DCG may represent a dual conversion gain DCG. For example, when the conversion gain control element DCGX is turned on, the capacity of the floating diffusion node FD may increase and the pixel circuit 110_1 may have a relatively low conversion gain (LCG). Conversely, when the conversion gain control element DCGX is turned off, the capacity of the floating diffusion node FD may decrease and the pixel circuit 110_1 may have a relatively high conversion gain (HCG). The pixel circuit 110_1 supporting a Dual Conversion Gain (DCG) mode may increase a dynamic range of the image sensing device.

In the pixel circuit 110_1, the selection transistors SX and SXB1 may operate complementarily (or inversely) to each other. That is, when the selection transistor SX is turned off, the transistor SXB1 may be turned on. If a voltage control signal SXBC with a fixed voltage level is used, the voltage level of the pixel signal PXOUT may increase and the settling time may increase. Accordingly, the image sensing device according to embodiments of the present disclosure may control the voltage trimming circuit 140 to receive the digital signal ADC_OUT corresponding to the voltage level of the pixel signal PXOUT, resulting in reduction in the settling time of the pixel signal PXOUT.

The operation of the pixel array 100_1 having the above-described constituent elements will be described in more detail with reference to the operation timing diagram of FIG. 4 to be described later.

Figure 4:
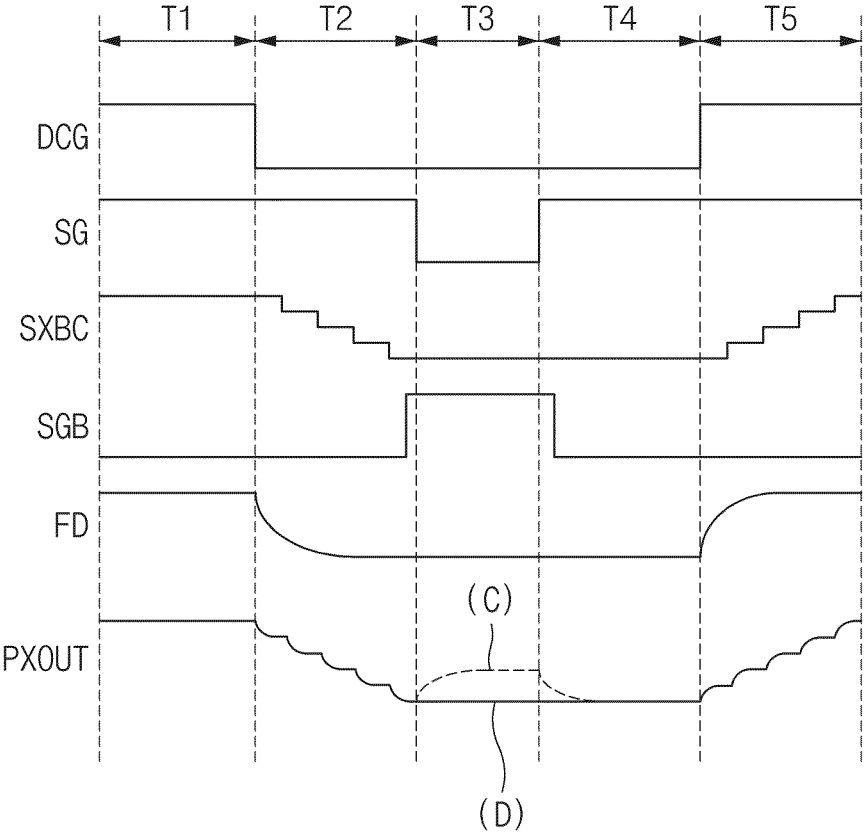
FIG. 4 is a timing diagram illustrating an operation of a pixel array shown in FIG. 1 according to another embodiment of the present disclosure.

FIG. 4 is a timing diagram illustrating an operation of the pixel array shown in FIG. 1 according to another embodiment of the present disclosure.

Referring to FIG. 4, the operations of the pixel array 100_1 may be divided into a plurality of time periods T1 to T5. Here, each of the time periods T1 and T5 may be a time period having a low conversion gain (LCG), and each of the time periods T2 to T4 may be a time period having a high conversion gain (HCG).

When the conversion gain control signal DCG is at a high level in the time period T1, the conversion gain control element DCGX may be turned on. Then, low conversion gain (LCG) data may be read in the time period T1.

In addition, when the selection control signal SG is at a high level, the selection transistor SX may be turned on and the electrical signal received from the source follower transistor SF may be output as the pixel signal PXOUT. Accordingly, in the time period T1, the voltage level of the pixel signal PXOUT may be maintained at a voltage level corresponding to the voltage level of the floating diffusion node FD.

Here, although the transistor SXB2 transmits a voltage corresponding to the voltage level of the voltage control signal SXBC to the transistor SXB1, the inverted selection control signal SGB is at a low level so that the transistor SXB1 may be turned off.

Thereafter, when the conversion gain control signal DCG transitions to a low level in the time period T2, the conversion gain control element DCGX may be turned off. Then, high conversion gain (HCG) data may be read in the time period T2.

When the conversion gain control element DCGX is turned off, the pixel signal PXOUT may gradually decrease in response to a decrease in the voltage level of the floating diffusion node FD. Here, the voltage control signal SXBC may be trimmed by the digital signal ADC_OUT corresponding to the voltage level of the pixel signal PXOUT. Therefore, the voltage level of the voltage control signal SXBC may decrease similar to the voltage level of the floating diffusion node FD. In some implementations, the voltage control signal SXBC may be a signal based on the digital signal ADC_OUT, so that the voltage level may sequentially decrease in a stepwise manner.

Subsequently, when the selection control signal SG transitions to a low level in the time period T3, the selection transistor SX may be turned off. Then, the electrical signal received from the source follower transistor SF is no longer transmitted as the pixel signal PXOUT.

In addition, when the inverted selection control signal SGB transitions to a high level, the transistor SXB1 may be turned on. Then, the voltage level of the pixel signal PXOUT may be adjusted to a voltage level corresponding to the voltage level of the voltage control signal SXBC.

That is, when the selection control signal SG transitions to a low level in the time period T3, the pixel signal PXOUT should also be maintained at the low level in response to the voltage level of the floating diffusion node FD. However, in a situation where the voltage control signal SXBC with a fixed voltage level is used, when the inverted selection control signal SGB transitions to a high level after entering the time period T3, the voltage corresponding to the voltage level of the voltage control signal SXBC may be transferred to the output node OUTN. Accordingly, as shown in (C) of FIG. 4, the voltage level of the pixel signal PXOUT may increase unnecessarily. This unnecessarily increased voltage level of the pixel signal PXOUT may increase the settling time in the time period T4, resulting in reduction in the readout speed.

However, the image sensing device according to embodiments of the present disclosure may change the voltage level of the voltage control signal SXBC according to the voltage level of the pixel signal PXOUT to prevent unnecessary increase in the voltage level of the pixel signal PXOUT, thereby reducing the settling time. That is, in the time period T2, the voltage level of the voltage control signal SXBC may be reduced similarly to the voltage level of the floating diffusion node FD.

The voltage level of the output node OUTN may be determined by the voltage level received from the transistor SXB2 in response to the voltage level of the voltage control signal SXBC. If the voltage level of the voltage control signal SXBC is similar or substantially the same as the voltage level of the floating diffusion node FD, the voltage level of the pixel signal PXOUT may not increase unnecessarily as shown in (D) of FIG. 4.

The image sensing device according to embodiments of the present disclosure may control the voltage trimming circuit 140 to receive the digital signal ADC_OUT corresponding to the voltage level of the pixel signal PXOUT, thereby controlling the voltage level of the voltage control signal SXBC. Accordingly, in the time period T3, the voltage control signal SXBC may be controlled to have the same or similar voltage level as the voltage of the floating diffusion node FD to prevent the voltage level of the pixel signal PXOUT from increasing unnecessarily, thereby reducing the settling time.

Thereafter, when the selection control signal SG transitions to a high level again in the time period T4, the selection transistor SX may be turned on. When the inverted selection control signal SGB transitions to a low level again, the transistor SXB1 may be turned off. Then, the voltage of the pixel signal PXOUT may settle to a voltage level corresponding to the voltage level of the floating diffusion node FD.

Subsequently, when the conversion gain control signal DCG transitions to a high level again in a time period T5, the conversion gain control element DCGX may be turned on. Then, the voltage level of the floating diffusion node FD may increase again. Additionally, since the selection control signal SG is kept at a high level, the voltage level of the pixel signal PXOUT may gradually increase in response to the voltage level of the floating diffusion node FD.

The voltage control signal SXBC may vary depending on the voltage level of the pixel signal PXOUT. Thus, as the voltage level of the pixel signal PXOUT increases, the voltage level of the voltage control signal SXBC may also increase. In some implementations, the voltage control signal SXBC is a signal based on a digital signal ADC_OUT, so that the voltage level may sequentially increase in a stepwise manner.

Figure 5:
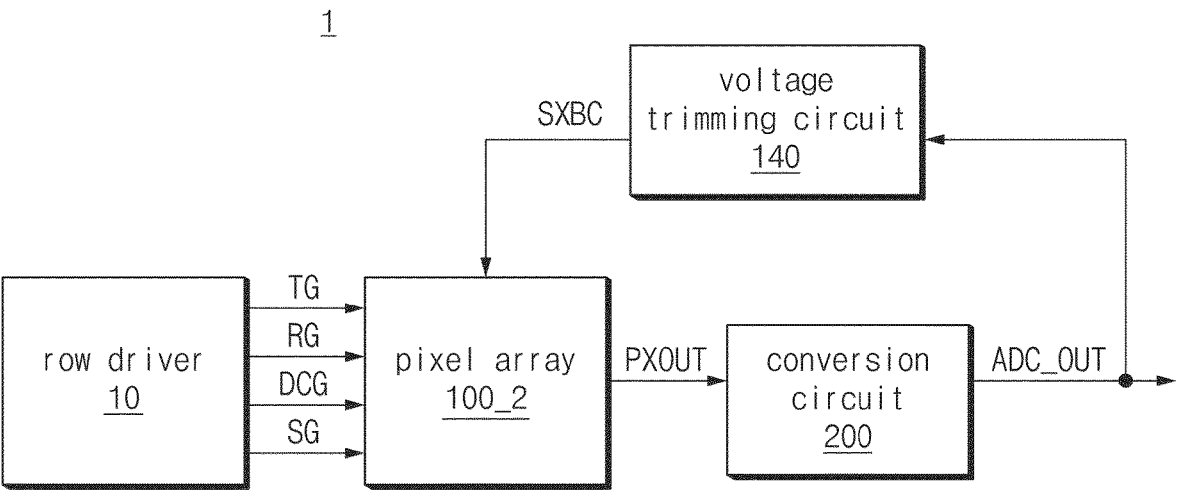
FIG. 5 is a block diagram illustrating a configuration of an image sensing device according to still another embodiment of the present disclosure.

FIG. 5 is a block diagram illustrating a configuration of an image sensing device according to still another embodiment of the present disclosure.

Referring to FIG. 5, the image sensing device 1 according to still another embodiment of the present disclosure may be implemented as part of an imaging device. The imaging device may refer to a device, for example, a digital still camera for photographing still images or a digital video camera for photographing moving images. For example, an imaging device may be implemented as a Digital Single Lens Reflex (DSLR) camera, a mirrorless camera, or a smartphone, and others, without being limited thereto. The imaging device may include a device provided with image pickup elements such that the device can capture (or photograph) a target object and thus create an image of the target object.

In some implementations, the imaging device may include not only the image sensing device 1, but also an image signal processor that performs image processing (e.g., demosaicing, noise reduction, etc.) on image data generated by the image sensing device 1.

The image sensing device 1 may be or include a complementary metal oxide semiconductor image sensor (CIS) for converting an optical signal into an electrical signal. The image sensing device 1 may include a row driver 10, a pixel array 100_2, a conversion circuit 200, and a voltage trimming circuit 140.

The row driver 10 may drive pixels of the pixel array 100_2. For example, the row driver 10 may generate control signals for selecting and controlling pixels included in at least one row line among a plurality of row lines of the pixel array 110_2. Here, the control signals may represent the above-described transfer signal TG, pixel reset signal RG, selection control signal SG, conversion gain control signal DCG, etc.

The pixel array 100_2 may include a plurality of pixel circuits consecutively arranged in a two-dimensional (2D) matrix structure (e.g., continuously arranged in a row direction and/or a column direction). Each of the plurality of pixel circuits may detect incident light and generate pixel data (e.g., pixel signal PXOUT) under control of the row driver 10. Pixel data may be data representing the number of photocharges generated in response to the intensity of incident light. Here, the pixel array 100_2 may represent the pixel array 100 illustrated in FIG. 1 or the pixel array 100_1 illustrated in FIG. 3. The structure of each pixel circuit of the pixel array 100_2 and the operation of generating pixel data (e.g., pixel signal PXOUT) are the same as those described in FIGS. 2 and 4 above.

In addition, the conversion circuit 200 may generate a digital signal ADC_OUT based on a ramp signal (not shown) and a pixel signal PXOUT. The image sensing device 1 may require an operation of converting an analog signal (e.g., pixel signal PXOUT) output from the pixel array 100_2 into a digital signal. For example, the conversion circuit 200 may perform a comparison operation on the pixel signal PXOUT and the ramp signal, and may output a digital signal ADC_OUT for digital code generation. Here, the conversion circuit 200 may include an analog-to-digital converter (ADC) that converts an analog signal into a digital signal.

In addition, the voltage trimming circuit 140 may trim a voltage level of the voltage control signal SXBC based on the digital signal ADC_OUT. For example, the voltage trimming circuit 140 may adjust the voltage level of the voltage control signal SXBC to a first level when a digital code value of the digital signal ADC_OUT is the first value. The voltage trimming circuit 140 may adjust the voltage level of the voltage control signal SXBC to a second level higher than the first level when the digital code value of the digital signal ADC_OUT is a second value greater than the first value.

In the embodiments of FIGS. 1 and 3 described above, the voltage trimming circuit 140 is shown as being included within the pixel array 100 or the pixel array 100_1. However, the embodiments of the present disclosure are not limited thereto, and as shown in FIG. 5, the voltage trimming circuit 140 may be located outside the pixel array 100_2. That is, the position of the voltage trimming circuit 140 controlling the voltage control signal SXBC may vary depending on the embodiments.

A voltage level of the floating diffusion node FD may affect the voltage level of the pixel signal PXOUT. That is, when the voltage level of the floating diffusion node FD increases or decreases, the voltage level of the pixel signal PXOUT may also increase or decrease. In addition, since the digital signal ADC_OUT is obtained by converting the analog pixel signal PXOUT into digital data, the digital signal ADC_OUT may also change in response to the pixel signal PXOUT.

Accordingly, the image sensing device according to embodiments of the present disclosure may control the voltage control signal SXBC in response to the digital signal ADC_OUT that changes based on the voltage level of the pixel signal PXOUT. Accordingly, according to the embodiments of the present disclosure, while the transistor SX is turned off and the voltage corresponding to the voltage level of the floating diffusion node FD is not supplied to the pixel signal PXOUT, the image sensing device may control the voltage level of the pixel signal PXOUT using the voltage control signal SXBC that is controlled similarly to the voltage level of the floating diffusion node FD, resulting in a reduction in the settling time.

In addition, the image sensing device according to the embodiments of the present disclosure may enable the image trimming circuit 140 to control the voltage control signal SXBC by detecting the digital signal ADC_OUT, resulting in a reduction in the settling time. However, the scope or spirit of the present disclosure is not limited thereto, and the voltage trimming circuit 140 may not detect the digital signal ADC_OUT, and may detect change information of the settling time to be settled in response to the voltage level of the floating diffusion node FD, so that the voltage trimming circuit 140 may trim the voltage level of the voltage control signal SXBC in a similar way to the voltage level of the floating diffusion node FD.

As is apparent from the above description, the image sensing device according to embodiments of the present disclosure can perform a high-speed readout operation by minimizing the settling time of a pixel signal being read out from the column line.

The embodiments of the present disclosure may provide a variety of effects capable of being directly or indirectly recognized through the above-mentioned embodiments of the present disclosure.

Although a number of illustrative embodiments have been described, it should be understood that modifications and enhancements to the disclosed embodiments and other embodiments can be devised based on what is described and/or illustrated in the present disclosure. Furthermore, the embodiments may be combined to form additional embodiments.

What is claimed is:

1. An image sensing device comprising:
a pixel circuit configured to output a pixel signal based on a voltage level of a floating diffusion node at which charges generated corresponding to an intensity of incident light are accumulated;
a voltage controller configured to control a voltage level of an output node where the pixel signal is output in response to a voltage control signal and an inverted selection control signal;
a conversion circuit configured to convert the pixel signal into a digital signal; and
a voltage trimming circuit configured to control the voltage control signal based on the digital signal.

2. The image sensing device according to claim 1, wherein the pixel circuit includes a selection transistor configured to output the pixel signal corresponding to the voltage level of the floating diffusion node in response to a selection control signal.

3. The image sensing device according to claim 2, wherein the pixel circuit further includes:

a source follower transistor configured to output a signal corresponding to the voltage level of the floating diffusion node to the selection transistor;
a photoelectric conversion element configured to generate the charges corresponding to the intensity of incident light;
a transfer transistor configured to transfer the charges generated by the photoelectric conversion element to the floating diffusion node in response to a transfer signal; and
a reset transistor configured to reset the voltage level of the floating diffusion node in response to a pixel reset signal.

4. The image sensing device according to claim 2, wherein the voltage controller includes:
a voltage control transistor connected between a power-supply voltage terminal and a first node and configured to receive the voltage control signal through a gate terminal thereof; and
an inversion transistor connected between the first node and the output node and configured to receive the inverted selection control signal through a gate terminal thereof, wherein the inverted selection control signal is opposite in phase to the selection control signal.

5. The image sensing device according to claim 4, wherein, during a time section where the selection transistor is turned off and the voltage level of the floating diffusion node is changed, the inversion transistor is turned on and a voltage level of the pixel signal is determined based on a voltage level of the voltage control signal.

6. The image sensing device according to claim 2, wherein:
when the selection transistor is turned off, a voltage level of the pixel signal is controlled in response to the voltage control signal; and
when the selection transistor is turned on, the voltage level of the pixel signal is controlled in response to the voltage level of the floating diffusion node.

7. The image sensing device according to claim 2, wherein the pixel circuit includes:
a source follower transistor configured to output a signal corresponding to the voltage level of the floating diffusion node to the selection transistor;
a photoelectric conversion element configured to generate the charges corresponding to the intensity of incident light;
a transfer transistor configured to transfer the charges generated by the photoelectric conversion element to the floating diffusion node in response to a transfer signal;
a reset transistor configured to reset the voltage level of the floating diffusion node in response to a pixel reset signal; and
a conversion gain control element configured to selectively supply a ground voltage to the floating diffusion node in response to a conversion gain control signal.

8. The image sensing device according to claim 7, wherein the conversion gain control element includes a transistor connected between the floating diffusion node and a ground voltage terminal and configured to receive a conversion gain control signal through a gate terminal thereof.

9. The image sensing device according to claim 1, wherein the voltage trimming circuit is configured to:
adjust a voltage level of the voltage control signal to a first level when a digital code value of the digital signal is a first value; and adjust a voltage level of the voltage control signal to a second level higher than the first level when the digital code value of the digital signal is a second value greater than the first value.

10. The image sensing device according to claim 1, further comprising a pixel biasing circuit connected between the output node and a ground voltage terminal and configured to be driven based on a bias voltage.

11. An image sensing device comprising:
a floating diffusion node configured to accumulate charges generated corresponding to an intensity of incident light;
a selection transistor configured to output a pixel signal corresponding to a voltage level of the floating diffusion node to an output node in response to a selection control signal;
a voltage control transistor connected between a power-supply voltage terminal and a first node and configured to receive a voltage control signal through a gate terminal thereof;
an inversion transistor connected between the first node and the output node and configured to receive an inverted selection control signal through a gate terminal thereof;
a conversion circuit configured to convert the pixel signal into a digital signal; and
a voltage trimming circuit configured to control the voltage control signal based on the digital signal.

12. The image sensing device according to claim 11, further comprising:
a source follower transistor configured to output a signal corresponding to the voltage level of the floating diffusion node to the selection transistor;
a photoelectric conversion element configured to generate the charges corresponding to the intensity of incident light;
a transfer transistor configured to transfer the charges generated by the photoelectric conversion element to the floating diffusion node in response to a transfer signal; and
a reset transistor configured to reset the voltage level of the floating diffusion node in response to a pixel reset signal.

13. The image sensing device according to claim 12, further comprising a conversion gain control element configured to selectively supply a ground voltage to the floating diffusion node in response to a conversion gain control signal.

14. The image sensing device according to claim 13, wherein, when the conversion gain control element is turned off and the inversion transistor is turned on, a voltage level of the output node is determined by the voltage control signal.

15. The image sensing device according to claim 11, wherein the inverted selection control signal is opposite in phase to the selection control signal.

16. The image sensing device according to claim 11, wherein, during a time section where the selection transistor is turned off and the voltage level of the floating diffusion node is changed, the inversion transistor is turned on and a voltage level of the pixel signal is determined based on a voltage level of the voltage control signal.

17. The image sensing device according to claim 11, wherein:
when the selection transistor is turned off, a voltage level of the pixel signal is controlled in response to the voltage control signal; and
when the selection transistor is turned on, a voltage level of the pixel signal is controlled in response to the voltage level of the floating diffusion node.

18. The image sensing device according to claim 11, wherein the voltage trimming circuit is configured to:
adjust a voltage level of the voltage control signal to a first level when a digital code value of the digital signal is a first value; and
adjust a voltage level of the voltage control signal to a second level higher than the first level when the digital code value of the digital signal is a second value greater than the first value.

19. The image sensing device according to claim 11, further comprising:
a pixel biasing circuit connected between the output node and a ground voltage terminal and configured to be driven based on a bias voltage.

20. An image sensing device comprising:
a pixel array including a plurality of pixels and configured to generate a pixel signal;
a row driver configured to drive the plurality of pixels;
a conversion circuit configured to generate a digital signal based on a ramp signal and the pixel signal; and
a voltage trimming circuit configured to trim, based on the digital signal, a voltage level of a control signal for controlling a voltage level of an output node through which the pixel signal is output,
wherein the voltage trimming circuit is configured to adjust the voltage level of the control signal to a first level when a digital code value of the digital signal is a first value, and adjust the voltage level of the control signal to a second level higher than the first level when the digital code value of the digital signal is a second value greater than the first value.

* * * * *